Patented Feb. 10, 1953

2,628,232

UNITED STATES PATENT OFFICE 2,628,232

LOWER ALIPHATIC ACID ESTERS OF CELLULOSE

Leonard J. Rosen, East Orange, Leon Kruth, Newark, and Blanche B. White, Summit, N. J., assignors to Celanese Corporation of America, New York, N. Y., a corporation of Delaware No Drawing. Application August 5, 1950, Serial No. 177,972

7 Claims. (Cl. 260—230)

This invention relates to the production of organic acid esters of cellulose and relates more particularly to an improved process for the production of secondary organic acid esters of cellulose.

In the production of secondary organic acid esters of cellulose, i. e. organic acid esters of cellulose containing free hydroxyl groups, such as cellulose acetate, for example, the esterification reaction is usually carried out by treating cellulose with an organic acid anhydride in the presence of a solvent for the cellulose ester being formed and of sulfuric acid as the esterification catalyst. The fully esterified cellulose is obtained in the form of a viscous, homogeneous solution in the solvent. Water is then added to this solution in an amount sufficient to convert any organic acid anhydride remaining to the corresponding acid. The fully esterified cellulose, usually after the addition of a further quantity of water to the solution, is permitted to hydrolyze or ripen to convert the same to the secondary ester. During ripening not only are acyl groups split off but, in addition, combined sulfuric acid is removed. Water and/or other non-solvent for the secondary organic acid ester of cellulose is then added to the viscous solution in an amount sufficient to precipitate the ester from solution, following which the precipitated ester is washed and may, if desired, be subjected to a stabilizing treatment with the object of reducing its content of combined sulfuric acid to a minimum.

While the foregoing process is widely used for the production of secondary organic acid esters of cellulose, it does not lend itself readily to the production of secondary esters having a high acyl content. If the ripening is carried out in such fashion as to remove only a small proportion of the acyl groups from the fully esterified cellulose obtained upon completion of esterification, it is found that the resultant ester contains a relatively high proportion of combined sulfuric acid which cannot be removed readily by conventional stabilization treatments and which imparts to the secondary organic acid ester of cellulose a poor stability as evidenced by a tendency of the ester to decompose, degrade and/or discolor.

It is an important object of this invention to provide a process for the production of secondary organic acid esters of cellulose which will be free from the foregoing and other disadvantages of the processes hitherto used for this purpose and which will be especially simple and efficient in operation.

A further object of this invention is to provide a process for the production of secondary organic acid esters of cellulose having a high acyl content which will exhibit good stability.

Other objects of this invention will be apparent from the following detailed description and claims.

We have now found that during the esterification of cellulose, the sulfuric acid, which is added as an esterification catalyst, combines quantitatively with the cellulose so that upon completion of esterification there is obtained a mixed ester containing both acid sulfate and acyl groups. The ratio of these groups in the fully esterified cellulose depends upon the proportion of sulfuric acid to cellulose in the esterification medium and may be varied over a wide range by increasing or decreasing the quantity of sulfuric acid in the medium. In accordance with this invention, the fully esterified cellulose obtained upon completion of esterification and which contains both acid sulfate and acyl groups is desulfurated to remove therefrom only the acid sulfate groups thereby to produce directly a secondary organic acid ester of cellulose which will exhibit good stability.

The process of this invention is carried out by esterifying cellulose with an organic acid anhydride in the presence of sulfuric acid and a solvent for the cellulose ester being formed. To the viscous solution obtained upon completion of esterification and containing the fully esterified cellulose, there may be added water in an amount of up to about 4%, based on the weight of the cellulose, in excess of that required to convert any organic acid anhydride remaining to the corresponding acid. There is also added to the viscous esterification solution an alkaline neutralizing agent in an amount sufficient to neutralize from about 75 to 85% of the sulfuric acid employed during the esterification. If desired, the viscous esterification solution may be diluted with an inert diluent, such as acetone, for example, before the neutralizing agent is added thereto to reduce its viscosity and assist in the uniform distribution of the neutralizing agent therethrough. The solution is held at a temperature of from about 35 to 40° C. for a period of 30 to 75 minutes. During this period, combined sulfuric acid is split off but substantially no acyl groups are removed from the cellulose ester. After the remaining catalyst is neutralized, water and/or other non-solvent for the organic acid ester of cellulose is added to the viscous solution in an amount sufficient to precipitate the secondary ester from solution, following which the precipitated ester is washed to remove therefrom all traces of free acid and other impurities.

There can be obtained, in accordance with this invention, secondary organic acid esters of cellulose such as cellulose acetate, for example, having an acetyl value of from 58 to 61% by weight, calculated as acetic acid, by employing in the esterification medium from about 7 to 20% by weight of sulfuric acid based on the weight of the cellulose to produce a cellulose ester containing from about 3.8 to 11.5% by weight of acid sulfate groups calculated as sulfuric acid. The addition of a greater proportion of sulfuric acid to the esterification medium, although not objectionable, will not appreciably alter the final acetyl value of the organic acid ester of cellulose, apparently owing to the reacetylation of the cellulose during the desulfuration of a fully esterified mixed ester of cellulose containing more than about 11.5% by weight of acid sulfate groups calculated as sulfuric acid.

Alkaline neutralizing agents that can be employed are, for example, magnesium salts including magnesium acetate and magnesium carbonate, sodium acetate or other alkali metal acetates, zinc acetate, aluminum acetate, calcium acetate, strontium acetate, barium acetate, strontium or barium oxide or hydroxide. When a carbonate is employed as neutralizing agent, water is derived from the carbonic acid formed during the neutralization and provides a portion of the water present during the desulfuration of the cellulose ester.

The secondary organic acid esters of cellulose produced in accordance with this invention exhibit a good stability and an extremely high viscosity and are, therefore, eminently suited for the production of high tenacity yarns, films, foils and the like.

The process of this invention will now be described specifically in connection with the production of cellulose acetate, which is commercially the most important organic acid ester of cellulose at the present time. However, it can also be employed for the production of other organic acid esters of cellulose including cellulose propionate, cellulose butyrate, cellulose acetate propionate, cellulose acetate butyrate and the like.

The following examples are given to illustrate this invention further:

*Example I*

Cellulose is esterified in conventional manner in a medium containing acetic anhydride, acetic acid and 7% by weight of sulfuric acid based upon the weight of the cellulose. There is added to the viscous, homogeneous solution obtained upon completion of esterification, sufficient magnesium carbonate to neutralize 75% of the sulfuric acid and the solution is stirred for 15 minutes at a temperature of 38° C. The solution is held at 38° C. for an additional 60 minutes. The remaining sulfuric acid is neutralized with magnesium carbonate and the cellulose acetate is precipitated from the solution by the addition of water, following which the precipitated ester is washed. There is obtained a secondary cellulose acetate having an acetyl value of 61.2% calculated as acetic acid and substantially free from combined sulfuric acid.

*Example II*

The process outlined in Example I is repeated using 13.2% by weight of sulfuric acid based upon the weight of the cellulose. There is obtained a secondary cellulose acetate having an acetyl value of 59.8% calculated as acetic acid and substantially free from combined sulfuric acid.

*Example III*

The process outlined in Example I is repeated using 20% by weight of sulfuric acid based upon the weight of the cellulose. There is obtained a secondary cellulose acetate having an acetyl value of 58.5% calculated as acetic acid and substantially free from combined sulfuric acid.

The term "lower aliphatic acid esters of cellulose," as employed in the claims, is to be construed as those aliphatic acid esters of cellulose in which the acyl radicles attached to the cellulose nucleus are of the group consisting of acetyl, propionyl and butyryl radicles.

It is to be understood that the foregoing detailed description is given merely by way of illustration and that many variations may be made therein without departing from the spirit of our invention.

Having described our invention, what we desire to secure by Letters Patent is:

1. In a process for the production of secondary lower aliphatic acid esters of cellulose wherein cellulose is esterified with a lower aliphatic acid anhydride in the presence of 7 to 20% by weight of sulfuric acid based on the weight of the cellulose and a solvent for the cellulose ester being formed and the cellulose ester is obtained in the form of a homogeneous solution upon completion of the esterification, the steps which comprise adding an alkaline neutralizing agent to the homogeneous solution in an amount sufficient to neutralize from about 75 to 85% of the sulfuric acid, and holding the homogeneous solution at a temperature of about 35 to 40° C. for a period of about 30 to 75 minutes to desulfurate the lower aliphatic acid ester of cellulose without removing any of the acyl groups therefrom.

2. In a process for the production of secondary lower aliphatic acid esters of cellulose wherein cellulose is esterified with a lower aliphatic acid anhydride in the presence of 7 to 20% by weight of sulfuric acid based on the weight of the cellulose and a solvent for the cellulose ester being formed and the cellulose ester is obtained in the form of a homogeneous solution upon completion of the esterification, the steps which comprise adding an alkaline neutralizing agent to the homogeneous solution in an amount sufficient to neutralize from about 75 to 85% of the sulfuric acid, adding water to the homogeneous solution in an amount of up to about 4% by weight based on the weight of the cellulose in excess of that required to convert any lower aliphatic acid anhydride remaining to the corresponding acid, and holding the homogeneous solution at a temperature of about 35 to 40° C. for a period of about 30 to 75 minutes to desulfurate the lower aliphatic acid ester of cellulose without removing any of the acyl groups therefrom.

3. In a process for the production of secondary lower aliphatic acid esters of cellulose wherein cellulose is esterified with a lower aliphatic acid anhydride in the presence of 7 to 20% by weight of sulfuric acid based on the weight of the cellulose and a solvent for the cellulose ester being formed and the cellulose ester is obtained in the form of a homogeneous solution upon completion of the esterification, the steps which comprise adding an alkaline neutralizing agent to the homogeneous solution in an amount sufficient to neutralize from about 75 to 85% of the sulfuric acid, adding water to the homogeneous solution in an amount of up to about 4% by weight based on the weight of the cellulose in excess of that required to convert any lower aliphatic acid anhydride remaining to the corresponding acid, and holding the homogeneous solution at a temperature of about 35 to 40° C. for a period of about 30 to 75 minutes to desulfurate the lower aliphatic acid ester of cellulose without removing any of the acyl groups therefrom.

4. In a process for the production of secondary cellulose acetate wherein cellulose is esterified with acetic anhydride in the presence of 7 to 20% by weight of sulfuric acid based on the weight of the cellulose and a lower aliphatic acid solvent for the cellulose acetate whereby the cellulose acetate is obtained in the form of a homogeneous solution upon completion of the esterification, the steps which comprise adding an alkaline neutralizing agent to the homogeneous solution in an amount sufficient to neutralize from about 75 to 85% of the sulfuric acid, and holding the homogeneous solution at a temperature of about 35 to 40° C. for a period of about 30 to 75 minutes to desulfurate the cellulose acetate without removing any of the acetyl groups therefrom.

5. In a process for the production of secondary cellulose acetate wherein cellulose is esterified with acetic anhydride in the presence of 7 to 20% by weight of sulfuric acid based on the weight of the cellulose and a lower aliphatic acid solvent for the cellulose acetate and the cellulose acetate is obtained in the form of a homogeneous solution upon completion of the esterification, the steps which comprise adding an alkaline neutralizing agent to the homogeneous solution in an amount sufficient to neutralize from about 75 to 85% of the sulfuric acid, adding water to the homogeneous solution in an amount of up to about 4% by weight based on the weight of the cellulose in excess of that required to convert any acetic anhydride remaining to acetic acid, and holding the homogeneous solution at a temperature of about 35 to 40° C. for a period of about 30 to 75 minutes to desulfurate the cellulose acetate without removing any of the acetyl groups therefrom.

6. In a process for the production of secondary cellulose acetate wherein cellulose is esterified with acetic anhydride in the presence of about 7 to 20% by weight sulfuric acid based on the weight of the cellulose and acetic acid as a solvent for the cellulose acetate and the cellulose acetate is obtained in the form of a homogeneous solution upon completion of esterification, the steps which comprise adding magnesium carbonate to the homogeneous solution in an amount sufficient to neutralize from about 75 to 85% of the sulfuric acid, and holding the homogeneous solution at a temperature of about 35 to 40° C. for a period of about 30 to 75 minutes to desulfurate the cellulose acetate without removing any of the acetyl groups therefrom.

7. In a process for the production of secondary cellulose acetate wherein cellulose is esterified with acetic anhydride in the presence of about 7 to 20% by weight sulfuric acid based on the weight of the cellulose and acetic acid as a solvent for the cellulose acetate and the cellulose acetate is obtained in the form of a homogeneous solution upon completion of esterification, the steps which comprise adding magnesium carbonate to the homogeneous solution in an amount sufficient to neutralize about 75% of the sulfuric acid, and holding the homogeneous solution at a temperature of about 38° C. for 75 minutes to desulfurate the cellulose acetate without removing any of the acetyl groups therefrom.

LEONARD J. ROSEN.
LEON KRUTH.
BLANCHE B. WHITE.

REFERENCES CITED

The following references are of record in the file of this patent:

UNITED STATES PATENTS

| Number | Name | Date |
|---|---|---|
| 2,073,853 | Schulze | Mar. 16, 1937 |
| 2,143,332 | Sindl et al. | Jan. 10, 1939 |
| 2,259,462 | Fletcher | Oct. 21, 1941 |
| 2,329,730 | Seymour et al. | Sept. 21, 1943 |
| 2,427,403 | Haney et al. | Sept. 16, 1947 |
| 2,432,341 | Seymour | Dec. 9, 1947 |
| 2,543,191 | Neilson et al. | Feb. 27, 1951 |

FOREIGN PATENTS

| Number | Country | Date |
|---|---|---|
| 538,913 | Great Britain | Aug. 21, 1941 |